United States Patent
K et al.

(10) Patent No.: US 11,362,925 B2
(45) Date of Patent: Jun. 14, 2022

(54) OPTIMIZING SERVICE NODE MONITORING IN SDN

(71) Applicant: Telefonaktiebolaget LM Ericsson (publ), Stockholm (SE)

(72) Inventors: Faseela K, Bengaluru (IN); Vyshakh Krishnan C H, Bangalore (IN); Riyazahmed D Talikoti, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/617,440

(22) PCT Filed: Jun. 1, 2017

(86) PCT No.: PCT/IN2017/050216
§ 371 (c)(1),
(2) Date: Nov. 26, 2019

(87) PCT Pub. No.: WO2018/220638
PCT Pub. Date: Dec. 6, 2018

(65) Prior Publication Data
US 2020/0169494 A1    May 28, 2020

(51) Int. Cl.
*H04L 12/26*    (2006.01)
*H04L 12/741*   (2013.01)
(Continued)

(52) U.S. Cl.
CPC ............ *H04L 43/16* (2013.01); *H04L 43/026* (2013.01); *H04L 43/10* (2013.01)

(58) Field of Classification Search
CPC ....... H04L 43/16; H04L 43/026; H04L 43/10; H04L 43/12; H04L 43/0852; H04L 43/0876
(Continued)

(56) References Cited

U.S. PATENT DOCUMENTS 9,602,398 B2    3/2017 Pettit et al.
9,729,442 B1 *  8/2017 Stark .................. H04L 45/745
(Continued)

FOREIGN PATENT DOCUMENTS

EP    3456020 A1 *  3/2019  .......... H04L 1/0052
WO   2015/166506 A1   11/2015
(Continued)

OTHER PUBLICATIONS

McKeown, N., Software-defined Networking, IEEE Infocon, Apr. 19-25, 2009, downloaded from https://www.es.xiu.edu/~cs752/papers/sdr-infocom_brazil_2009_v1-1.pdf on Aug. 12, 2019, pp. 1-64.
(Continued)

*Primary Examiner* — Kevin T Bates
*Assistant Examiner* — Golam Mahmud
(74) *Attorney, Agent, or Firm* — Christopher & Weisberg, P.A.

(57) ABSTRACT

A method implemented by a switch in a software defined networking (SDN) network to monitor a service node communicatively coupled to the switch. The method includes generating a first flow entry that matches packets received from the service node, generating a second flow entry that matches packet received from the service node, wherein the second flow entry has a priority that is lower than a priority of the first flow entry, removing the first flow entry and transmitting a flow removed message to an SDN controller in response to a determination that the first flow entry has timed out, maintaining a statistic associated with the second flow entry, and transmitting a statistics trigger event message to the SDN controller in response to a determination that the statistic associated with the second flow entry exceeds a threshold value.

18 Claims, 12 Drawing Sheets

(51) Int. Cl.
*H04L 12/721* (2013.01)
*H04L 12/715* (2013.01)
*H04L 12/64* (2006.01)
*H04L 29/06* (2006.01)
*H04L 29/08* (2006.01)
*H04L 29/12* (2006.01)
*H04L 12/46* (2006.01)
*H04L 43/16* (2022.01)
*H04L 43/026* (2022.01)
*H04L 43/10* (2022.01)

(58) Field of Classification Search
USPC .......................................................... 709/224
See application file for complete search history.

(56) References Cited

U.S. PATENT DOCUMENTS

| | | | |
|---|---|---|---|
| 9,923,831 B2* | 3/2018 | Wang | H04L 45/38 |
| 10,009,261 B2* | 6/2018 | Zhang | H04L 45/745 |
| 2011/0286324 A1* | 11/2011 | Bellagamba | H04L 45/28 370/219 |
| 2013/0250958 A1* | 9/2013 | Watanabe | H04L 45/74 370/392 |
| 2014/0146674 A1* | 5/2014 | Wang | H04L 45/54 370/235 |
| 2014/0317684 A1* | 10/2014 | Porras | H04L 63/20 726/1 |
| 2014/0371880 A1* | 12/2014 | Lee | H04L 43/0817 700/20 |
| 2015/0098475 A1* | 4/2015 | Jayanarayana | H04L 45/64 370/400 |
| 2015/0109923 A1* | 4/2015 | Hwang | H04L 41/0813 370/235 |
| 2015/0281106 A1* | 10/2015 | Lee | H04L 45/38 370/236 |
| 2015/0281127 A1* | 10/2015 | Liu | H04L 41/0893 370/401 |
| 2016/0050131 A1* | 2/2016 | Zhang | H04L 43/0811 370/244 |
| 2016/0050132 A1* | 2/2016 | Zhang | H04L 43/16 370/252 |
| 2016/0337228 A1* | 11/2016 | Cai | H04L 41/0631 |
| 2016/0380899 A1* | 12/2016 | Lee | H04L 41/0896 370/235 |
| 2017/0041209 A1* | 2/2017 | Joshi | H04L 45/02 |
| 2017/0142034 A1 | 5/2017 | K et al. | |
| 2017/0149640 A1 | 5/2017 | Narayanan et al. | |
| 2018/0219788 A1* | 8/2018 | Wackerly | H04L 47/122 |
| 2020/0067809 A1* | 2/2020 | K | H04L 41/0681 |
| 2020/0084128 A1* | 3/2020 | Schneider | H04L 45/38 |

FOREIGN PATENT DOCUMENTS

| | | |
|---|---|---|
| WO | 2016/018181 A1 | 2/2016 |
| WO | 2017/021889 A1 | 2/2017 |
| WO | 2018/162953 A1 | 9/2018 |

OTHER PUBLICATIONS

Open Networking Foundation, "OpenFlow Switch Specification," Version 1.5.0 (Protocol version 0x06), ONF TS-020, Dec. 19, 2014, pp. 1-277.
Open Networking Foundation, "OpenFlow Switch Specification," Version 1.5.1 (Protocol version 0x06), ONF TS-025, Mar. 26, 2015, pp. 1-283.
Open vSwitch Manual, Open vSwitch 2.3.90, DB Schema 7.10.1, ovs-vswitchd.conf.db(5), Sep. 14, 2011, pp. 1-58.
EPO Communication dated Apr. 7, 2022 for Patent Application No. 17911840.1, consisting of 8-pages.
Open Networking Foundation; OpenFlow Switch Specification, Version 1.3.1 (Wire Protocol 0x04); The Open Networking Foundation; Sep. 6, 2012, consisting of 128-pages.

* cited by examiner

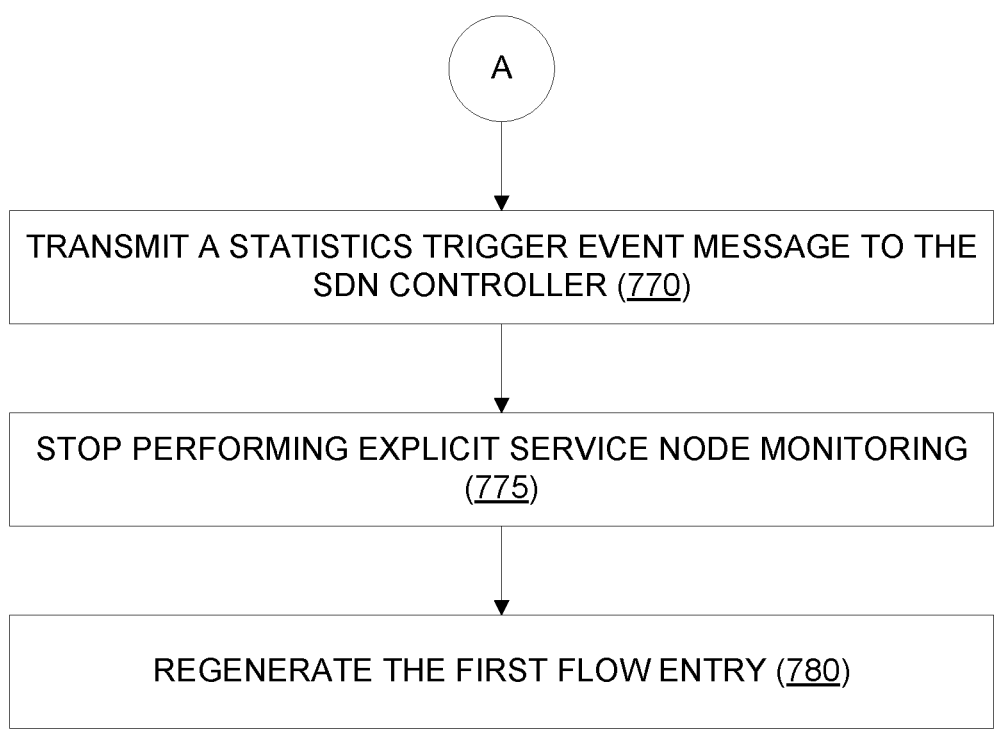
FIG. 7 (CONT')

OPTIMIZING SERVICE NODE MONITORING IN SDN

CROSS-REFERENCE TO RELATED APPLICATIONS

This application is a National stage of International Application No. PCT/IN2017/050216, filed Jun. 1, 2017, which is hereby incorporated by reference.

TECHNICAL FIELD

Embodiments of the invention relate to the field of computer networks, and more specifically, to optimizing monitoring of service nodes in software defined networking (SDN) networks.

BACKGROUND

Software defined networking (SDN) is an approach to computer networking that employs a split architecture network in which the forwarding plane (sometimes referred to as the data plane) is decoupled from the control plane. The use of a split architecture network simplifies the network devices (e.g., switches) implementing the forwarding plane by shifting the intelligence of the network into one or more controllers that oversee the switches. SDN facilitates rapid and open innovation at the network layer by providing a programmable network infrastructure.

OpenFlow is a protocol that enables controllers and switches in an SDN network to communicate with each other. OpenFlow enables dynamic programming of flow control policies in the network. An OpenFlow switch includes a programmable packet processing pipeline (sometimes referred to as the OpenFlow pipeline). The OpenFlow pipeline includes one or more flow tables, where each flow table includes one or more flow entries. The flow tables of an OpenFlow pipeline are sequentially numbered, starting from zero. Pipeline processing typically starts at the first flow table (e.g., flow table 0). When processed by a flow table, a packet is matched against the flow entries of the flow table to select a flow entry. If a flow entry is found, the instruction set included in that flow entry is executed.

Network operators may leverage SDN technologies to provide service chaining. With service chaining, subscriber traffic is steered through a pre-defined sequence of service nodes. The service nodes provide various network services such as content caching, content filtering, and security related services. Service chaining enables the network operator to steer traffic based on pre-defined policies (e.g., based on subscriber profiles and application profiles) in a highly granular manner. It also allows the network operator to quickly and easily introduce new services for subscribers.

In the case of SDN-based service chaining, the network can be divided into a transport domain and a service domain. The transport domain typically includes multiple switches (or other types of data plane nodes) that forward traffic and the service domain typically includes multiple service nodes that apply services. The service nodes are typically connected to the transport domain via Virtual Local Area Network (VLAN) or similar mechanism. In order to avoid prolonged service disruptions, it is important to be able to monitor the switches in the transport domain and the service nodes in the service domain.

Switches can be monitored using protocols such as Link Layer Discovery Protocol (LLDP) or Bidirectional Forwarding Detection (BFD). However, unlike switches, the service nodes are more akin to servers (and typically do not implement any switching functionality). Thus, the same techniques that are used to monitor switches (e.g., using LLDP or BFD) may not be applicable for monitoring service nodes. For example, LLDP may not be used for monitoring a service node since service nodes typically do not respond to LLDP messages. Due to such differences, different techniques are needed to monitor service nodes.

One conventional technique for monitoring service nodes uses the Address Resolution Protocol (ARP). With this technique, an SDN controller configures a switch to forward ARP request messages received from the SDN controller towards the service nodes to which the switch is connected. The SDN controller also configures the switch to punt any ARP response messages that it receives from the service nodes to the SDN controller. The SDN controller periodically generates an ARP request messages for a service node and sends the ARP request message to the switch so that the switch can forward the ARP request messages to the service node. When the switch receives an ARP response message from the service node, the switch punts the ARP response message to the SDN controller. If the SDN controller does not receive an ARP response corresponding to a previously sent ARP request message within a specific time interval, the SDN controller may conclude that the service node is not operational and update the status of the service node accordingly. Another conventional technique for monitoring service nodes employs application level monitoring, where protocols such as Hypertext Transfer Protocol (HTTP) are used to monitor the liveliness of service nodes. With this technique, the SDN controller sends an HTTP request to a service node and determines whether the service node is operational based on whether it receives a response from the service node. However, conventional techniques such as those described above have the disadvantage that they are agnostic to the current traffic load in the network, use constant bandwidth, and are susceptible to network delays.

SUMMARY

A method is implemented by a switch in a software defined networking (SDN) network to monitor a service node communicatively coupled to the switch. The method includes generating a first flow entry that matches packets received from the service node, generating a second flow entry that matches packet received from the service node, wherein the second flow entry has a priority that is lower than a priority of the first flow entry, removing the first flow entry and transmitting a flow removed message to an SDN controller in response to a determination that the first flow entry has timed out, maintaining a statistic associated with the second flow entry, and transmitting a statistics trigger event message to the SDN controller in response to a determination that the statistic associated with the second flow entry exceeds a threshold value.

A network device is configured to function as a switch in a software defined networking (SDN) network to monitor a service node communicatively coupled to the switch. The network device includes a set of one or more processors and a non-transitory machine-readable storage medium having stored therein a service node monitoring component. The service node monitoring component, when executed by the set of one or more processors, causes the network device to generate a first flow entry that matches packets received from the service node, generate a second flow entry that matches packet received from the service node, wherein the second flow entry has a priority that is lower than a priority of the first flow entry, remove the first flow entry and transmit a flow removed message to an SDN controller in response to a determination that the first flow entry has timed out, maintain a statistic associated with the second flow entry, and transmit a statistics trigger event message to the SDN controller in response to a determination that the statistic associated with the second flow entry exceeds a threshold value.

A non-transitory machine-readable medium has computer code stored therein, which when executed by a set of one or more processors of a network device functioning as a switch in a software defined networking (SDN) network, causes the network device to perform operations for monitoring a service node communicatively coupled to the switch. The operations include generating a first flow entry that matches packets received from the service node, generating a second flow entry that matches packet received from the service node, wherein the second flow entry has a priority that is lower than a priority of the first flow entry, removing the first flow entry and transmitting a flow removed message to an SDN controller in response to a determination that the first flow entry has timed out, maintaining a statistic associated with the second flow entry, and transmitting a statistics trigger event message to the SDN controller in response to a determination that the statistic associated with the second flow entry exceeds a threshold value.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
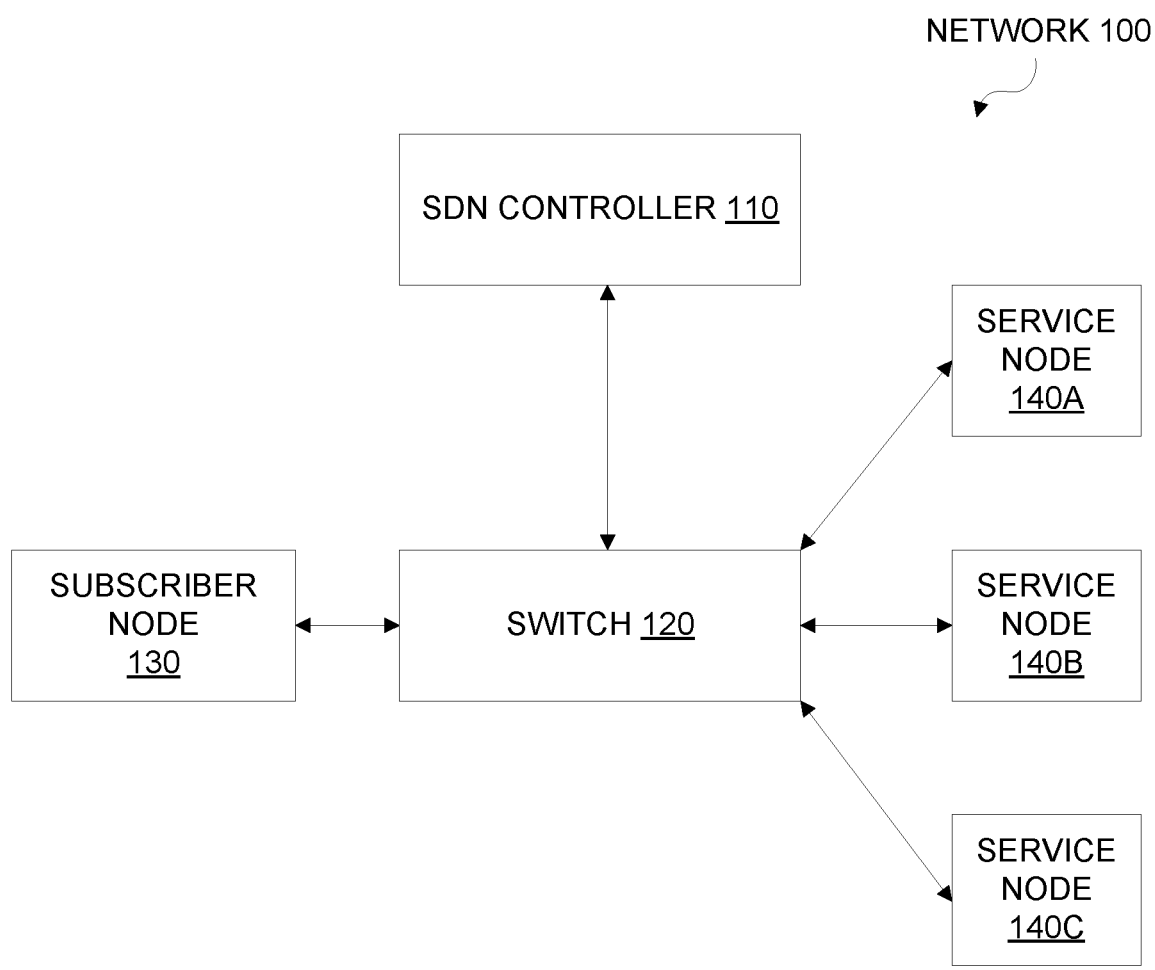
FIG. 1 is a diagram of a network in which service node monitoring can be implemented, according to some embodiments.

The following description describes methods and apparatus for monitoring a service node in a software defined networking (SDN) network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, conventional techniques for monitoring service nodes in an SDN network have the disadvantage that they are agnostic to the current traffic load in the network. As the traffic load on the data plane of the network increases, the traffic load on the control plane also increases. This causes the switch to consume more of its computing resources, which makes it more difficult for the switch to spare computing resources for lower priority tasks such as monitoring. This causes monitoring to slow down when it is needed the most (when the traffic load is high, any delay in failure detection is costlier than when the traffic load is lower). Conventional techniques also have the disadvantage that they use constant bandwidth. The amount of bandwidth used for monitoring purposes is typically a constant quantity that depends on the desired failure detection speed and the size of the network. This means that the amount of bandwidth used is independent of the current traffic load in the network. Conventional techniques also have the disadvantage that they are susceptible to network delays. Path monitoring traffic is typically sent with the same class of service as normal data traffic. As the traffic load on the network increases, the path monitoring traffic starts experiencing increased queueing delays, which delays the path failure detection.

Embodiments disclosed herein overcome some of the disadvantages of the conventional techniques by reusing existing traffic being sent between a switch and a service node to monitor the service node and only resorting to explicit service node monitoring techniques when there is no traffic flowing between the switch and the service node for a period of time. As used herein, an explicit service node monitoring technique refers to a monitoring technique that relies on injecting monitoring traffic into the network, where the sole or primary purpose of the monitoring traffic is to monitor the service node (and not for carrying user data) (e.g., ARP messages in the ARP-based monitoring techniques described above). Such traffic that is injected into the network may be referred to herein as explicit service node monitoring traffic (which may include explicit service node monitoring packets). Embodiments are based on the observation that when traffic is flowing between the switch and the service node, there is no need to inject explicit service node monitoring traffic into the network since it can be inferred from the existing traffic flowing between the switch and the service node that the service node is operational. As will be described in greater detail below, embodiments may achieve this by programming a particular set of flow entries at the switch. As will become apparent from the disclosure provided herein, an advantage of the embodiments disclosed herein is that they only resort to explicit service node monitoring techniques (that rely on injecting explicit service node monitoring traffic into the network) when there is no traffic being sent between a switch and a service node, and thus bandwidth usage and processing load at the switch can be reduced.

FIG. 1 is a diagram of a network in which service node monitoring can be implemented, according to some embodiments. The network 100 (which is an SDN network) includes an SDN controller 110 that is communicatively coupled to a switch 120. In one embodiment, the SDN controller 110 and the switch 120 communicate with each other using a southbound communications protocol such as OpenFlow (e.g., OpenFlow 1.5) or similar southbound protocol. The SDN controller 110 may use OpenFlow or a similar southbound protocol to configure and manage the forwarding behavior of the switch 120. For clarity and ease of understanding, embodiments are primarily described in a context where the SDN controller 110 and the switch 120 implement OpenFlow as the southbound communication protocol. However, it should be understood that the SDN controller 110 and the switch 120 can implement other types of southbound communication protocols and that the service node monitoring techniques disclosed herein can be implemented in a context where the SDN controller 110 and the switch 120 implement other types of southbound communications protocols without departing from the spirit and scope of the present disclosure. For sake of illustration, the network 100 is shown as including a single SDN controller 110 that manages a single switch 120. However, it should be understood that the network 100 can include more than one SDN controller 110 and that a given SDN controller 110 can manage more than one switch 120.

The switch 120 may include a packet processing pipeline that includes a set of flow tables. Each flow table may include a set of flow entries, where each flow entry includes a packet matching criteria (e.g., carried in a match field) and a corresponding set of instructions to execute when a packet matches the packet matching criteria. A packet is said to match a flow entry if the packet matches the packet matching criteria of the flow entry. In one embodiment, when a switch 120 receives a packet in the data plane, the switch 120 initially matches the packet against flow entries in the foremost flow table of the packet processing pipeline. The switch 120 may then continue to match the packet against flow entries in subsequent flow tables of the packet processing pipeline. If the packet matches a flow entry, then the switch 120 executes the corresponding set of instructions of that flow entry. In one embodiment, flow entries are assigned a priority. If the packet matches the packet matching criteria of multiple flow entries within a flow table, only the flow entry having the highest priority is selected (and its instructions executed). The set of instructions specified in a flow entry may include, for example, instructions to modify the packet, direct the packet to another flow table in the packet processing pipeline, and/or output the packet to a specified port.

The switch 120 is also communicatively coupled to a subscriber node 130 and multiple service nodes 140 (e.g., service nodes 140A-C). The subscriber node 130 may be a subscriber device that accesses the network 100 such as a laptop, mobile phone, smartphone, tablet, phablet, Voice Over Internet Protocol (VoIP) phone, user equipment, terminal, portable media player, gaming system, set-top box, or any combination thereof. The switch 120 may forward traffic generated by the subscriber node 130 (which may be referred to herein as "subscriber traffic") to one or more of the service nodes 140 to apply services to the subscriber's traffic. For example, each of the service nodes 140 may apply different services such as content caching, content filtering, and security related services (e.g., deep packet inspection (DPI)). The service nodes 140 are distinct from the switches 120 in that they are more akin to servers in that they do not typically implement any switching functionality. In one embodiment, a service node 140 may be implemented as a physical node or a virtual node (e.g., using Network Function Virtualization (NFV)). In one embodiment, the subscriber node 130 is connected to the switch 120 over a Virtual Extensible Local Area Network (VxLAN) or similar mechanism. In one embodiment, the switch 120 is connected to each of the service nodes 140 over a Virtual Local Area Network (VLAN) or similar mechanism.

Figure 2:
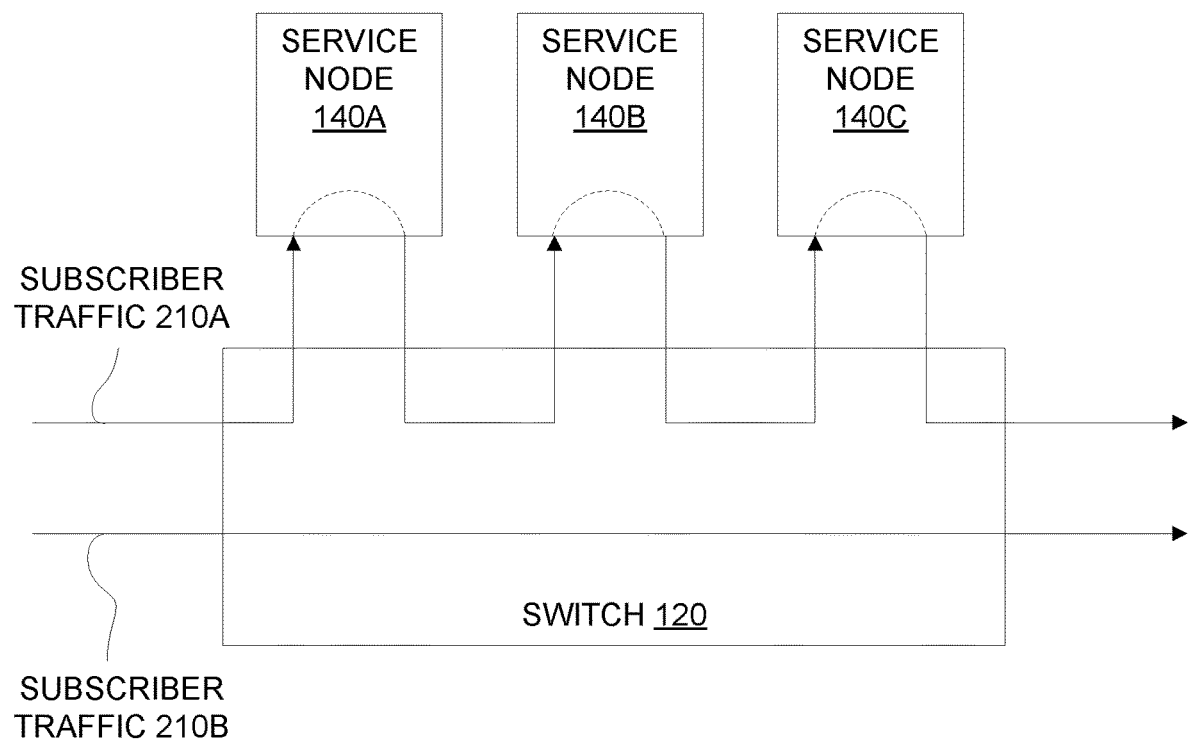
FIG. 2 is a diagram illustrating a switch that applies service chaining to subscriber traffic, according to some embodiments.

FIG. 2 is a diagram illustrating a switch that applies service chaining to subscriber traffic, according to some embodiments. As shown in the diagram, the switch 120 applies service chaining to subscriber traffic 210A by steering subscriber traffic 210A through a pre-defined sequence of service nodes 140. In this example, the switch 120 steers subscriber traffic 210A through service node 140A, service node 140B, and service node 140C (in that order). In contrast, the switch 120 does not apply service chaining for subscriber traffic 210B and thus subscriber traffic 210B is not steered through the service nodes 140.

Figure 3:
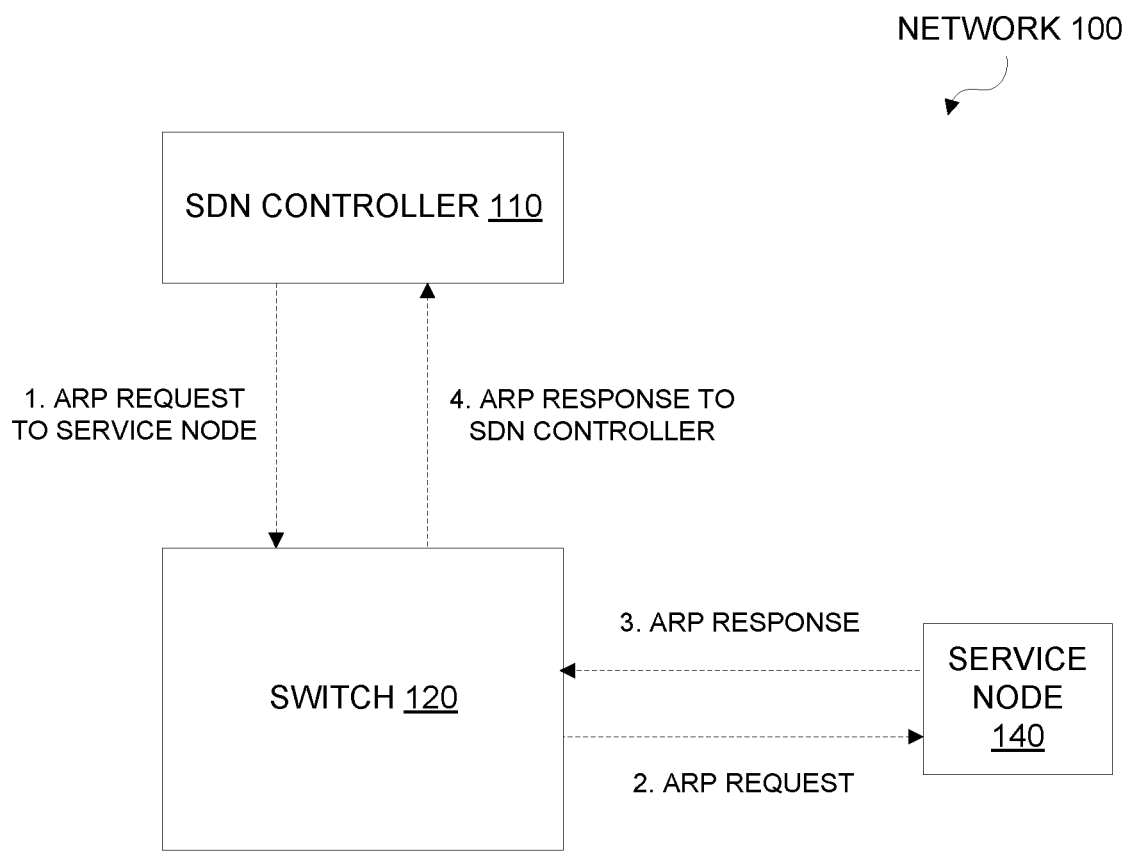
FIG. 3 is a diagram illustrating an explicit service node monitoring technique, according to some embodiments.

FIG. 3 is a diagram illustrating an explicit service node monitoring technique, according to some embodiments. The explicit service node monitoring technique is a conventional technique that uses the Address Resolution Protocol (ARP) for monitoring a service node 140. With this technique, an SDN controller 110 configures the switch 120 to forward ARP request messages received from the SDN controller 110 towards the service node 140. The SDN controller 110 also configures the switch 120 to punt any ARP response messages that it receives from the service node 140 to the SDN controller 110. Subsequently, at operation 1, the SDN controller 110 sends an ARP request message to the switch 120. At operation 2, the switch 120 forwards the ARP request message to the service node 140. At operation 3, the switch 120 receives an ARP response message from the service node 140. At operation 4, the switch 120 punts the ARP response message to the SDN controller 110. If the SDN controller 110 receives the ARP response message, then the SDN controller 110 may conclude that the service node 140 is operation. However, if the SDN controller 110 does not receive an ARP response message corresponding to the previously sent ARP request message within a specific time interval, the SDN controller 110 may conclude that the service node 140 is not operational and update the status of the service node 140 accordingly. Conventional techniques such as the one described above have the disadvantage that they are agnostic to the current traffic load in the network, use constant bandwidth, and are susceptible to network delays.

Figure 4:
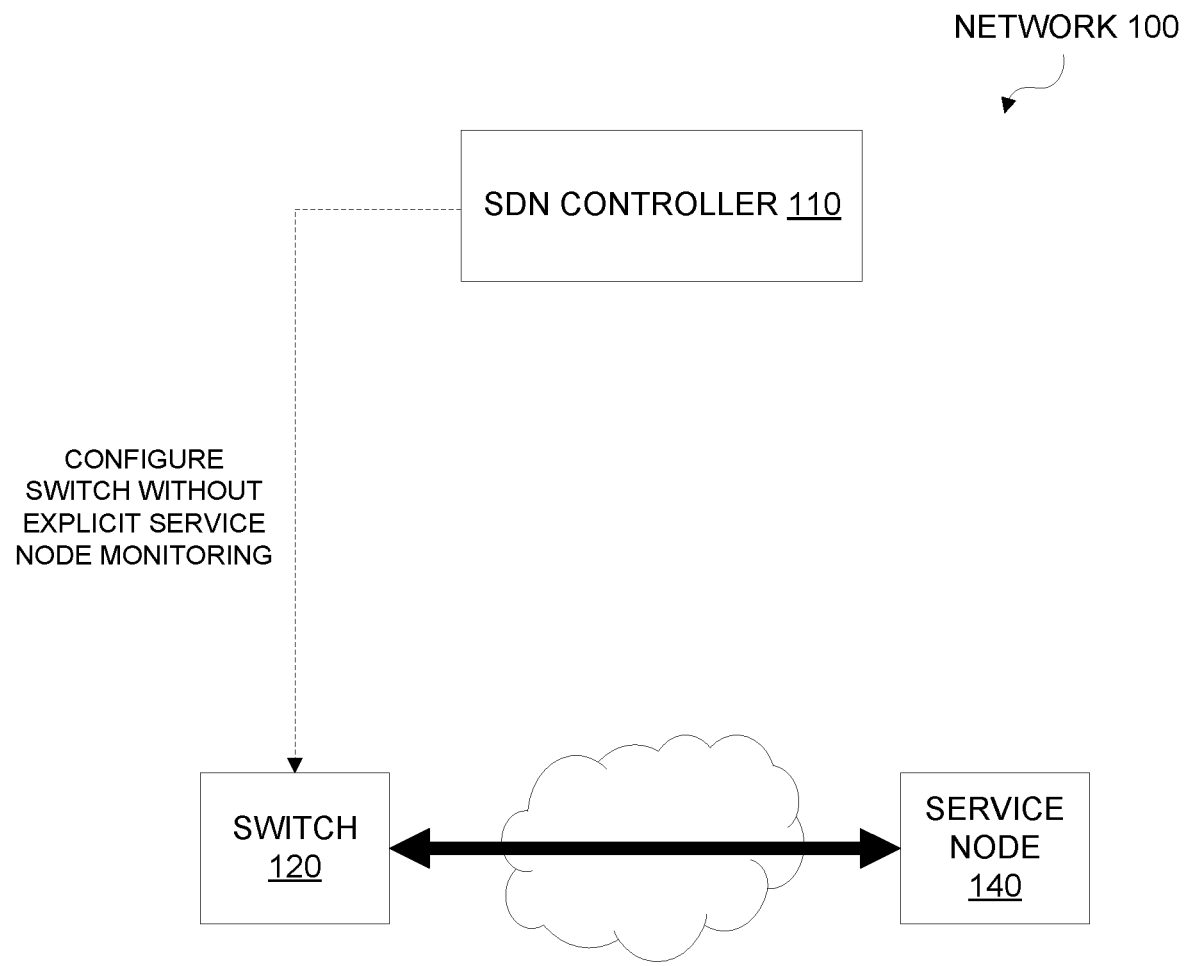
FIG. 4 is a diagram illustrating operations by an SDN controller to configure a switch to monitor a service node, according to some embodiments.

FIG. 4 is a diagram illustrating operations by an SDN controller to configure a switch to monitor a service node, according to some embodiments. As shown in the diagram, the SDN controller 110 configures/programs the switch 120 to forward traffic to service node 140 and receive traffic back from service node 140 (e.g., as part of service chaining) without explicit service node monitoring. In one embodiment, the SDN controller 110 programs a particular set of flow entries in the switch 120 to process traffic received from the service node 140 and to monitor the service node 140. These flow entries may include a failure detect flow entry to detect when the service node 140 (or a communication path between the switch 120 and the service node 140) has potentially failed and a recovery detect flow entry to detect when the service node 140 (or the communication path between the switch 120 and the service node 140) has potentially recovered from failure. The failure detect flow entry and the recovery detect flow entry are described in greater detail herein below.

The failure detect flow entry detects when the service node 140 has potentially failed. In one embodiment, the failure detect flow entry includes a packet matching criteria that matches packets that are received from the service node 140 and an instruction to forward matching packets to a service node traffic processing pipeline (for normal processing of traffic coming from the service node 140—this may involve, for example, directing the packet to another flow table that is responsible for handling traffic coming from the service node 140). In one embodiment, the SDN controller 110 programs the failure detect flow entry with a timeout mechanism such that the failure detect flow entry times out if no packets match the failure detect flow entry for a specified period of time (e.g., equal to or slightly less than the interval at which the explicit service node monitoring technique would send explicit service node monitoring traffic). In one embodiment, if the failure detect flow entry times out, the switch 120 removes the failure detect flow entry and transmits a message to the SDN controller 110 indicating that the failure detect flow entry has been removed (this message may be referred to herein as a flow removed message).

An example of a failure detect flow entry is shown in Table I.

TABLE I

| PACKET MATCHING CRITERIA | PRI-ORITY | IDLE TIMEOUT | INSTRUCTIONS |
|---|---|---|---|
| SERVICE NODE PORT, LOCAL IP, REMOTE IP | 50 | 1 SEC | FORWARD TO SERVICE NODE TRAFFIC PROCESSING PIPELINE |

The packet matching criteria of the failure detect flow entry shown in Table I is set to match packets received from the service node 140 (identified by service node port, local Internet Protocol (IP) address (e.g., IP address of the service node 140), and remote IP address (e.g., IP address of the switch 120). The priority of the failure detect flow entry is set to 50. The idle timeout of the failure detect flow entry is set to 1 second so that the failure detect flow entry times out if no packets match the failure detect flow entry for at least 1 second. The instructions of the failure detect flow entry include an instruction to forward matching packets to the service node traffic processing pipeline. It should be understood that the failure detect flow entry shown in Table I is provided by way of example and not intended to be limiting. For example, in other embodiments, the packet matching criteria may use more or fewer fields than shown to match packets received from the service node 140.

Figure 5:
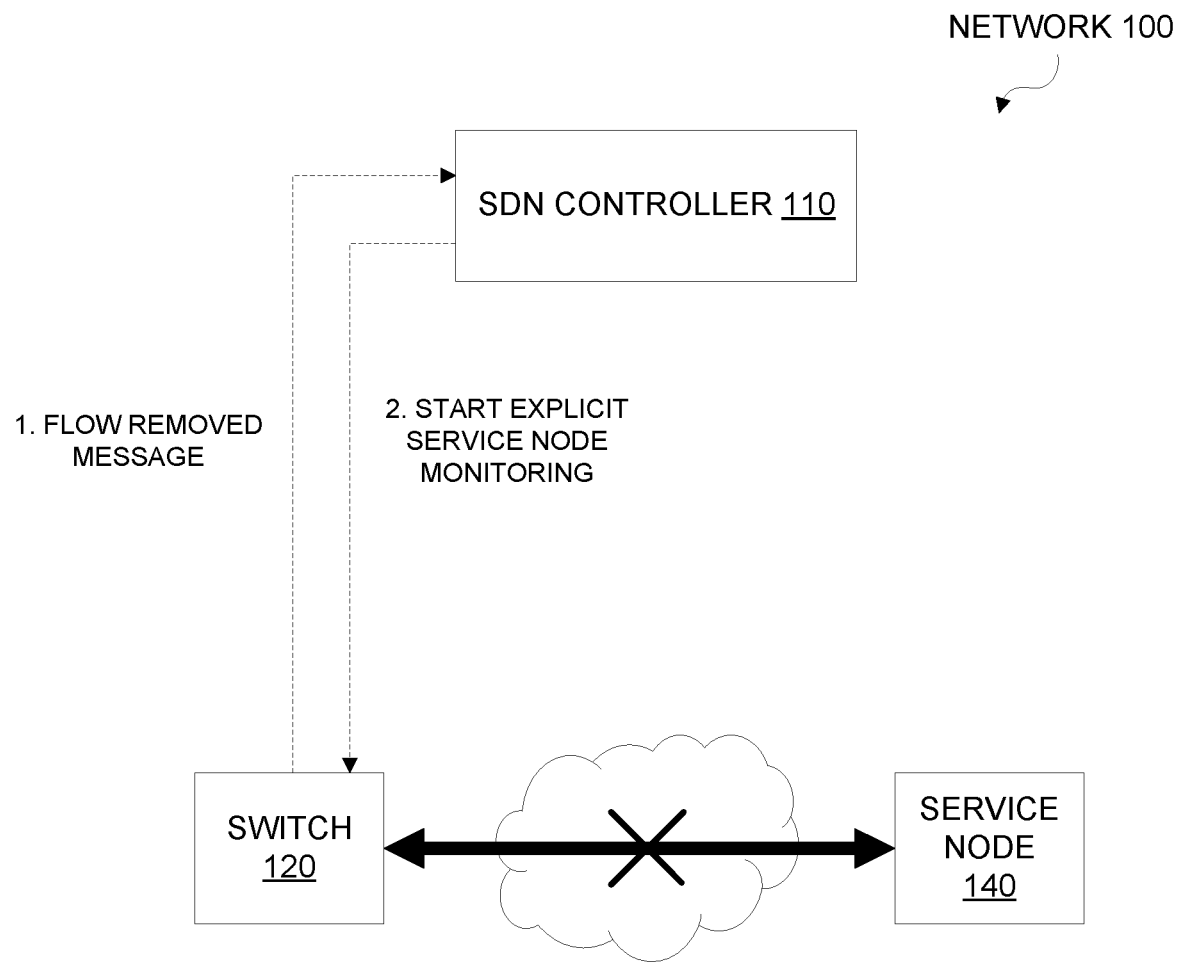
FIG. 5 is a diagram illustrating operations by an SDN controller and a switch when a failure detect flow entry times out, according to some embodiments.

FIG. 5 is a diagram illustrating operations by an SDN controller and a switch when a failure detect flow entry times out, according to some embodiments. When a communication path between the switch 120 and the service node 140 is operational, the switch 120 receives traffic coming from the service node 140 and the packets belonging to this traffic will match the failure detect flow entry in switch 120. As a result, the packets will be forwarded to the service node traffic processing pipeline, and be processed accordingly. However, as shown in FIG. 5, when the communication path between the switch 120 and the service node 140 fails, the switch 120 does not receive traffic coming from the service node 140. In this case, if the communication path does not recover within a specified period of time (e.g., within the idle timeout value programmed in the failure detect flow entry), the failure detect flow entry times out. This results in the switch 120 removing the failure detect flow entry. As a result, at operation 1, the switch 120 transmits a flow removed message to the SDN controller 110. Based on receiving the flow removed message, SDN controller 110 may determine that the switch 120 has not received traffic from the service node 140 for at least the specified period of time. In response, at operation 2, the SDN controller 110 may start explicit service node monitoring to determine whether the service node 140 (or the communication path between the switch 120 and the service node 140) has failed or if there is just an absence of traffic coming from the service node 140.

It should be noted that when the failure detect flow entry times out, it can indicate either (1) the service node 140 and the communication path between the switch 120 and the service node 140 is operational but the service node 140 has no traffic to send to the switch 120 or (2) the service node 140 or the communication path between the switch 120 and the service node 140 has failed. When the failure detect flow entry times out, explicit service node monitoring techniques can be used to confirm the reason for the failure detect flow entry timing out. In the case that the failure detect flow entry timed out due to the service node 140 not having any traffic to send to the switch 120, explicit service node monitoring can be allowed to continue until the service node 140 has some traffic to send to the switch 120, which can be detected by the recovery detect flow entry.

The recovery detect flow entry detects when the service node 140 and/or the communication path between the switch 120 and the service node 140 has potentially recovered from failure. In one embodiment, the recovery detect flow entry includes the same packet matching criteria and the same instructions as the failure detect flow entry. That is, the recovery detect flow entry includes a packet matching criteria that matches packets that are received from the service node 140 and an instruction to forward matching packets to the service node traffic processing pipeline. In addition, in one embodiment, the recovery detect flow entry includes an instruction referred to herein as a statistics trigger instruction (e.g., OFPIT_STAT_TRIGGER instruction in OpenFlow). The statistics trigger instruction instructs the switch 120 to maintain a statistic associated with the recovery detect flow entry and to transmit a message to the SDN controller 110 when the statistic associated with the recovery detect flow entry exceeds a threshold value (this message may be referred to herein as a statistics trigger event message). In one embodiment, the recovery detect flow entry includes an indication of the threshold value. For example, the threshold value may be indicated as a number of packets, in which case the switch 120 keeps track of the number of packets that have matched the recovery detect flow entry and transmits a statistics trigger event message to the SDN controller 110 when the number of packets that have matched the recovery detect flow entry exceeds the specified number of packets. As another example, the threshold value may be indicated as a byte count, in which case the switch 120 keeps track of the cumulative byte count of the packets that have matched the recovery detect flow entry and transmits a statistics trigger event message to the SDN controller 110 when the cumulative byte count of the packets that have matched the recovery detect flow entry exceeds the specified byte count. In one embodiment, the statistics trigger instruction includes an indication that the statistics trigger event message is to be transmitted to the SDN controller 110 when the statistic associated with the recovery detect flow entry exceeds any multiple of the threshold value (e.g., OSPSTF_PERIODIC flag setting in OpenFlow).

In one embodiment, the recovery detect flow entry has a priority that is lower than the priority of the corresponding failure detect flow entry. As such, when the switch 120 includes both the failure detect flow entry and the recovery detect flow entry, packets received from the service node 140 may match the packet matching criteria of both the failure detect flow entry and the recovery detect flow entry, but the switch 120 only executes the instructions of the failure detect flow entry since it has higher priority. However, after the failure detect flow entry is removed (e.g., due to the failure detect flow entry timing out), packets received from the service node 140 match the recovery detect flow entry and the switch 120 executes the instructions of the recovery detect flow entry (including the statistics trigger instruction).

An example of a recovery detect flow entry (corresponding to the failure detect flow entry shown in Table I) is shown in Table II.

TABLE III

| PACKET MATCHING CRITERIA | PRI-ORITY | IDLE TIMEOUT | INSTRUCTIONS |
| --- | --- | --- | --- |
| SERVICE NODE PORT, LOCAL IP, REMOTE IP | 5 | | FORWARD TO SERVICE NODE TRAFFIC PROCESSING PIPELINE; STAT_TRIGGER (THRESHOLD=1 PACKET) |

The packet matching criteria of the recovery detect flow entry shown in Table II is set to match packets received from the service node 140 (identified by service node port, local Internet Protocol (IP) address, and remote IP address). This packet matching criteria is typically set to be the same as the packet matching criteria of the corresponding failure detect flow entry. The priority of the recovery detect flow entry is set to 5, which is lower than the priority of the corresponding failure detect flow entry (which was set to 50). In this example, a higher number indicates higher priority (and a lower number indicates lower priority), but it should be understood that a different convention can be used. The instructions of the recovery detect flow entry include an instruction to forward matching packets to the service node traffic processing pipeline. In addition, the instructions include a statistics trigger instruction (STAT_TRIGGER) that instructs the switch 120 to transmit a statistics trigger event message to the SDN controller 110 if at least one packet matches the recovery detect flow entry (THRESHOLD=1 PACKET). In this example, the recovery detect flow entry does not have an idle timeout (it does not time out). It should be understood that the recovery detect flow entry shown in Table II is provided by way of example and not intended to be limiting. For example, in other embodiments, the packet matching criteria may use more or fewer fields than shown to match packets received from the service node 140.

In one embodiment, the statistics trigger instruction uses the following structure and fields:

```
/* Instruction structure for OFPIT_STAT_TRIGGER */
struct ofp_instruction_stat_trigger {
    uint16_t type; /* OFPIT_STAT_TRIGGER */
    uint16_t len; /* Length is padded to 64 bits. */
    uint32_t flags; /* Bitmap of OFPSTF_* flags. */
    struct ofp_stats thresholds; /* Threshold list. Variable size. */
};
OFP_ASSERT(sizeof(struct ofp_instruction_stat_trigger) == 16);
```

The flags field is a bitmap that defines the behavior of the statistics trigger. It may include a combination of the following flags:

```
enum ofp_stat_trigger_flags {
    OFPSTF_PERIODIC = 1 << 0, /* Trigger for all multiples of thresholds. */
    OFPSTF_ONLY_FIRST = 1 << 1. /* Trigger on only first reach threshold. */
};
```

When the OFPSTF_PERIODIC flag is set, the trigger will apply not only on the values in the thresholds field, but also on all multiples of those values. It allows, for example, to have a trigger every 100 packets for the lifetime of the flow. When the OFPSTF_ONLY_FIRST flag is set, only the first threshold that is crossed is considered, and other thresholds are ignored.

Figure 6:
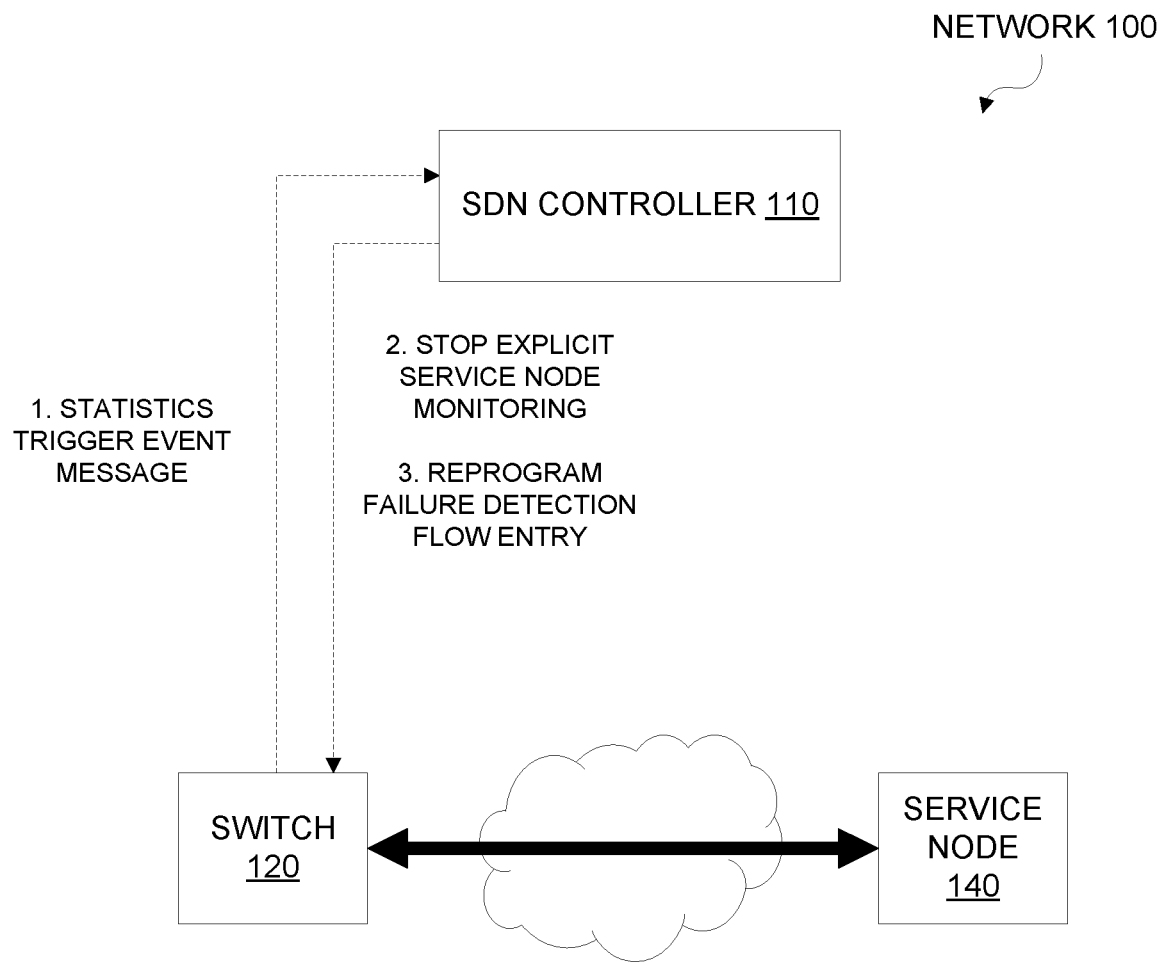
FIG. 6 is a diagram illustrating operations by an SDN controller and a switch when a statistic associated with a recovery detect flow entry exceeds a threshold value, according to some embodiments.

FIG. 6 is a diagram illustrating operations by an SDN controller and a switch when a statistic associated with a recovery detect flow entry exceeds a threshold value, according to some embodiments. Continuing with the example described with reference to FIG. 5, when the service node 140 or the communication path between the switch 120 and the service node 140 recovers from failure and the switch 120 starts receiving traffic from service node 140 again, the packets belonging to the traffic received from the service node 140 will match the recovery detect flow entry in the switch 120 (since failure detect flow entry has been removed). As a result, the packets will be forwarded to the service node traffic processing pipeline, and be processed accordingly. In addition, as shown in FIG. 6, if the statistic associated with the recovery detect flow entry exceeds the threshold value (or a multiple thereof), then at operation 1, the switch 120 transmits a statistics trigger event message to SDN controller 110. Based on receiving the statistics trigger event message, the SDN controller 110 may determine that the switch 120 is receiving traffic from service node 140 again and that the service node 140 or the communication path between the switch 120 and the service node 140 has recovered from failure. In response, at operation 2, the SDN controller 110 may stop explicit service node monitoring and at operation 3, reprogram the failure detection flow entry in the switch 120 (to detect future failures).

In one embodiment, the SDN controller 110 programs a flow entry in the switch 120 to handle explicit service node monitoring traffic. Such a flow entry may be referred to herein as an explicit service node monitoring flow entry. In one embodiment, the explicit service node monitoring flow entry includes a packet matching criteria that matches explicit service node monitoring packets (e.g., ARP messages) that are received from the service node 140 and an instruction to forward matching packets to the service node monitoring pipeline (for normal explicit service node monitoring processing). In one embodiment, this flow entry has a priority that is higher than the priority of the recovery detect flow entry so that the explicit service node monitoring packets do not trigger the switch 120 to send a statistics trigger event message to the SDN controller 110 (e.g., based on executing the instructions of the recovery detect flow entry).

An example of an explicit service node monitoring flow entry is shown in Table III.

TABLE IIII

| PACKET MATCHING CRITERIA | PRI-ORITY | IDLE TIMEOUT | INSTRUCTIONS |
| --- | --- | --- | --- |
| SERVICE NODE PORT, LOCAL IP, REMOTE IP, MONITORING PROTOCOL TYPE | 10 | | FORWARD TO SERVICE NODE MONITORING PIPELINE |

The packet matching criteria of the explicit service node monitoring flow entry shown in Table III is set to match packets having an explicit service node monitoring protocol type (e.g., ARP messages) received from the service node 140 (identified by service node port, local Internet Protocol (IP) address, and remote IP address). The priority of the explicit service node monitoring flow entry is set to 10, which is higher than the priority of the corresponding recovery detect flow entry (shown in Table II). The instructions of the explicit service node monitoring flow entry include an instruction to forward matching packets to the service node monitoring pipeline. In this example, the explicit service node monitoring flow entry does not have an idle timeout (it does not time out). It should be understood that the service node monitoring flow entry shown in Table III is provided by way of example and not intended to be limiting. For example, in other embodiments, the packet matching criteria may use more or fewer fields than shown to match packets received from the service node 140.

When explicit service node monitoring is being performed, the explicit service node monitoring packets (e.g., ARP messages) received from the service node 140 may match the packet matching criteria of both the explicit service node monitoring flow entry and the recovery detect flow entry, but the switch 120 only executes the instructions of the explicit service node monitoring flow entry since it has higher priority. This allows the switch 120 to handle explicit service node monitoring packets without triggering a statistics trigger event message.

Figure 7:
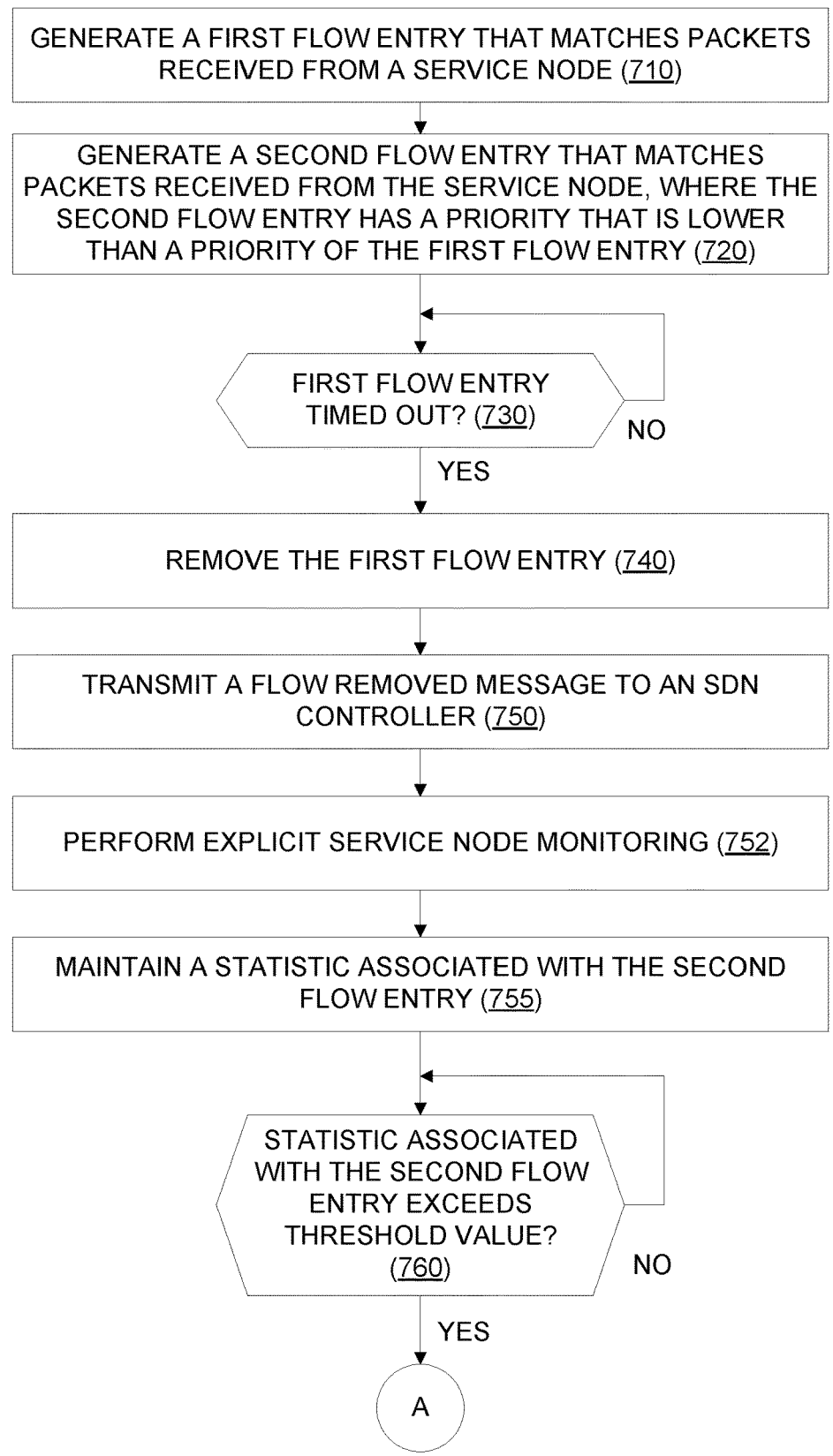
FIG. 7 is a flow diagram of a process for monitoring a service node in an SDN network, according to some embodiments.

FIG. 7 is a flow diagram of a process for monitoring a service node in an SDN network, according to some embodiments. In one embodiment, the process is performed by a network device functioning as a switch 120 in the SDN network 100. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated by the switch 120 generating a first flow entry (e.g., failure detect flow entry) (block 710) and a second flow entry (e.g., recovery detect flow entry) (block 720). Both the first flow entry and the second flow entry may have a packet matching criteria that matches packets received from the service node 140, but the second flow entry has a priority that is lower than the priority of the first flow entry. As such, if the switch 120 receives a packet that matches the packet matching criteria of both flow entries, the switch 120 executes the instructions of the first flow entry. In one embodiment, the first flow entry and the second flow entry are generated in a foremost flow table of a packet processing pipeline (e.g., table 0 in Open-Flow). In one embodiment, the first flow entry and the second flow entry include an instruction to direct matching packets to a service node traffic processing pipeline. In one embodiment, the first flow entry times out if no packets match the first flow entry for a given period of time. In one embodiment, the first flow entry includes an indication of an idle timeout value (e.g., a value indicating how long it takes for the first flow entry to time out). If the switch 120 determines that the first flow entry has timed out (decision block 730), the switch 120 removes the first flow entry (block 740) and transmits a flow removed message to the SDN controller 110 (block 750) to indicate that the first flow entry has been removed. This may indicate to the SDN controller 110 that the service node 140 or the communication path between the switch 120 and the service node 140 has potentially failed and cause the SDN controller 110 to start explicit service node monitoring, where the explicit service node monitoring involves injecting explicit service node monitoring traffic into a data plane of the SDN network 100. The switch 120 may then perform explicit service node monitoring (e.g., by forwarding ARP messages received from the SDN controller 110 to the service node 140 and forwarding ARP messages received back from the service node 140 to the SDN controller 110) (block 752). Returning to decision block 730, if the first flow entry has not timed out, the switch 120 continues normal packet processing until the first flow entry times out.

Once the first flow entry has been removed, packets received from the service node 140 will match the second flow entry. The switch 120 maintains a statistic associated with the second flow entry (e.g., based on a statistics trigger instruction included in the second flow entry) (block 755). The switch 120 determines whether the statistic associated with the second flow entry exceeds a threshold value (decision block decision block 760). In one embodiment, the statistic associated with the second flow entry is a packet count of packets that matched the second flow entry. In another embodiment, the statistic associated with the second flow entry is a cumulative byte count of packets that matched the second flow entry. In one embodiment, the second flow entry includes an indication of the threshold value. If the statistic associated with the second flow entry has not exceeded the threshold value, the switch 120 continues normal packet processing until the statistic associated with the second flow entry exceeds the threshold value. If the switch 120 determines that the statistic associated with the second flow entry has exceeded the threshold value, the switch 120 transmits a statistics trigger event message to the SDN controller 110 (block 770). This may indicate to the SDN controller 110 that the service node 140 or the communication path between the switch 120 and the service node 140 has potentially recovered from failure and cause the SDN controller 110 to stop explicit service node monitoring, which also causes the switch 120 to stop performing explicit service node monitoring (block 775). In one embodiment, the second flow entry includes an indication that the statistics trigger event message is to be transmitted to the SDN controller 110 when the statistic associated with the second flow entry exceeds a multiple of the threshold value (e.g., OFPSTF_PERIODIC flag setting in OpenFlow). In this embodiment, the switch 120 transmits a statistics trigger event message to the SDN controller 110 whenever the statistic associated with the second flow entry exceeds a multiple of the threshold value (e.g., every packet or every 10,000 bytes). In one embodiment, after the switch 120 transmits the statistics trigger event message to the SDN controller 110, the switch 120 receives an instruction from the SDN controller 110 to regenerate the first flow entry. The switch 120 may then regenerate the first flow entry (block 780) (e.g., according to instructions received from the SDN controller 110).

In one embodiment, the switch 120 generates a third flow entry (e.g., explicit service node monitoring flow entry) that matches explicit service node monitoring packets (e.g., ARP messages) received from the service node 140. In one embodiment, the third flow entry has a priority that is higher than the priority of the second flow entry. This allows the switch 120 to handle explicit service node monitoring packets without triggering a statistics trigger event message.

Figure 8:
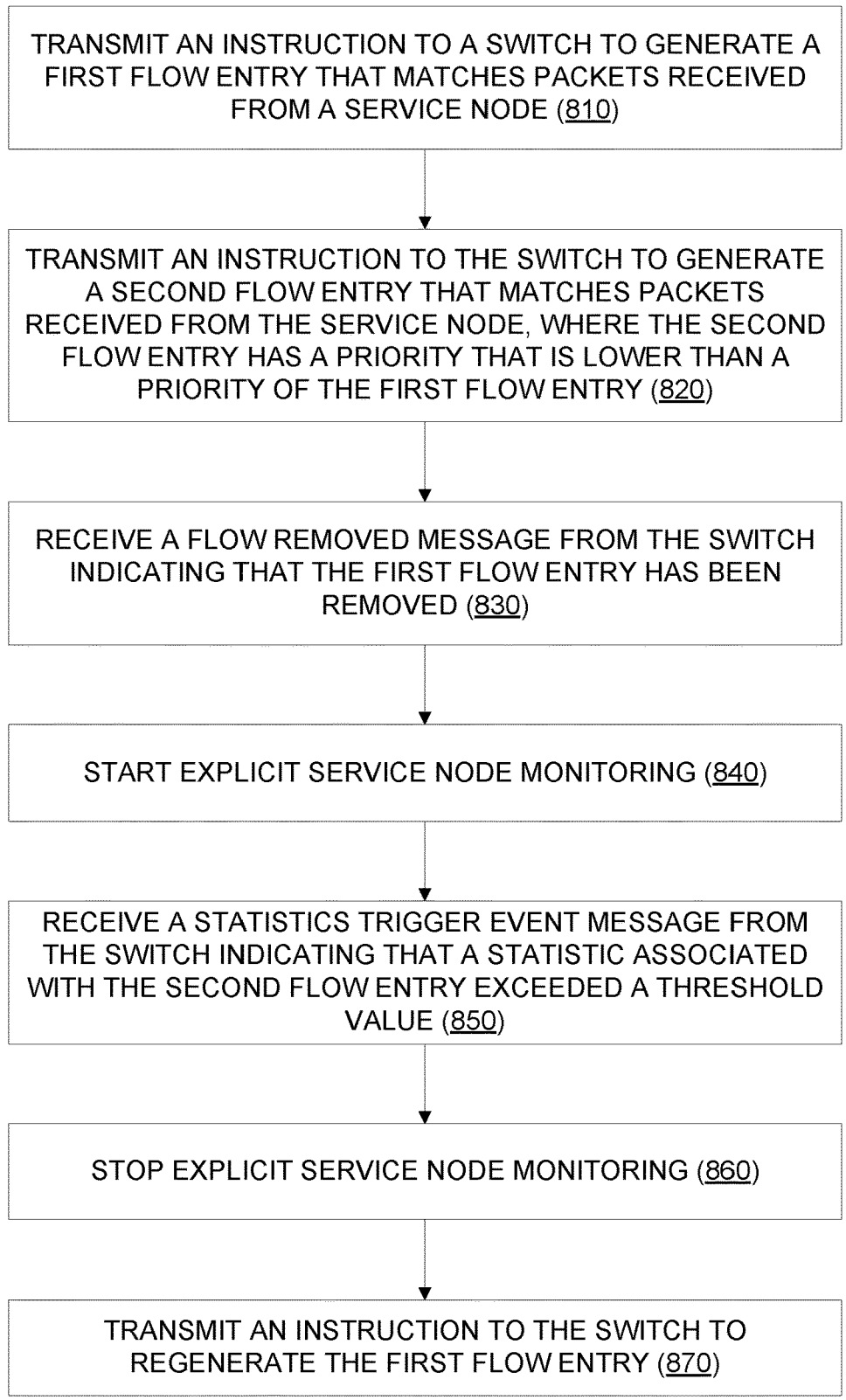
FIG. 8 is a flow diagram of a process for monitoring a service node in an SDN network, according to some embodiments.

FIG. 8 is a flow diagram of a process for monitoring a service node in an SDN network, according to some embodiments. In one embodiment, the process is performed by a network device functioning as an SDN controller 110 in the SDN network 100.

In one embodiment, the process is initiated by the SDN controller 110 transmitting an instruction to a switch 120 to generate a first flow entry that matches packets received from the service node 140 (block 810). The SDN controller 110 also transmits an instruction to the switch 120 to generate a second flow entry that matches packets received from the service node 140, where the second flow entry has a priority that is lower than a priority of the first flow entry (block 820). In one embodiment, the first flow entry is a failure detect flow entry and the second flow entry is a corresponding recovery detect flow entry. The SDN controller 110 may subsequently receive a flow removed message from the switch 120 indicating that the first flow entry has been removed (block 830). This may indicate that the service node 140 or a communication path between the switch 120 and the service node 140 has potentially failed. In response, the SDN controller 110 may start explicit service node monitoring (block 840).

Subsequently, the SDN controller 110 may receive a statistics trigger event message from the switch 120 indicating that a statistic associated with the second flow entry exceeded a threshold value (block 850). This may indicate that the service node 140 or the communication path between the switch 120 and the service node 140 has potentially recovered from failure. In response, the SDN controller 110 may stop explicit service node monitoring (block 860) and transmit an instruction to the switch 120 to regenerate the first flow entry (block 870).

An advantage of the embodiments disclosed herein is that they only resort to explicit service node monitoring techniques when there is no traffic being received from the service node 140, and thus bandwidth usage and processing load at the switch 120 can be reduced. This advantage becomes even more pronounced as the number of service nodes 140 increase. Another advantage of the embodiments disclosed herein is that they avoid much of the latency that is typically involved with controller-driven monitoring, where the path of controller->switch->service node->switch->controller is latency prone. The path from controller->switch and switch->controller contributes to a major portion of the latency as these paths lie on the control plane of the network. Another advantage of the embodiments disclosed herein is that they do not require any proprietary extensions (at least for the OpenFlow implementations disclosed herein). Other advantages will be apparent to one having ordinary skill in the art from the disclosure provided herein.

Figure 9A:
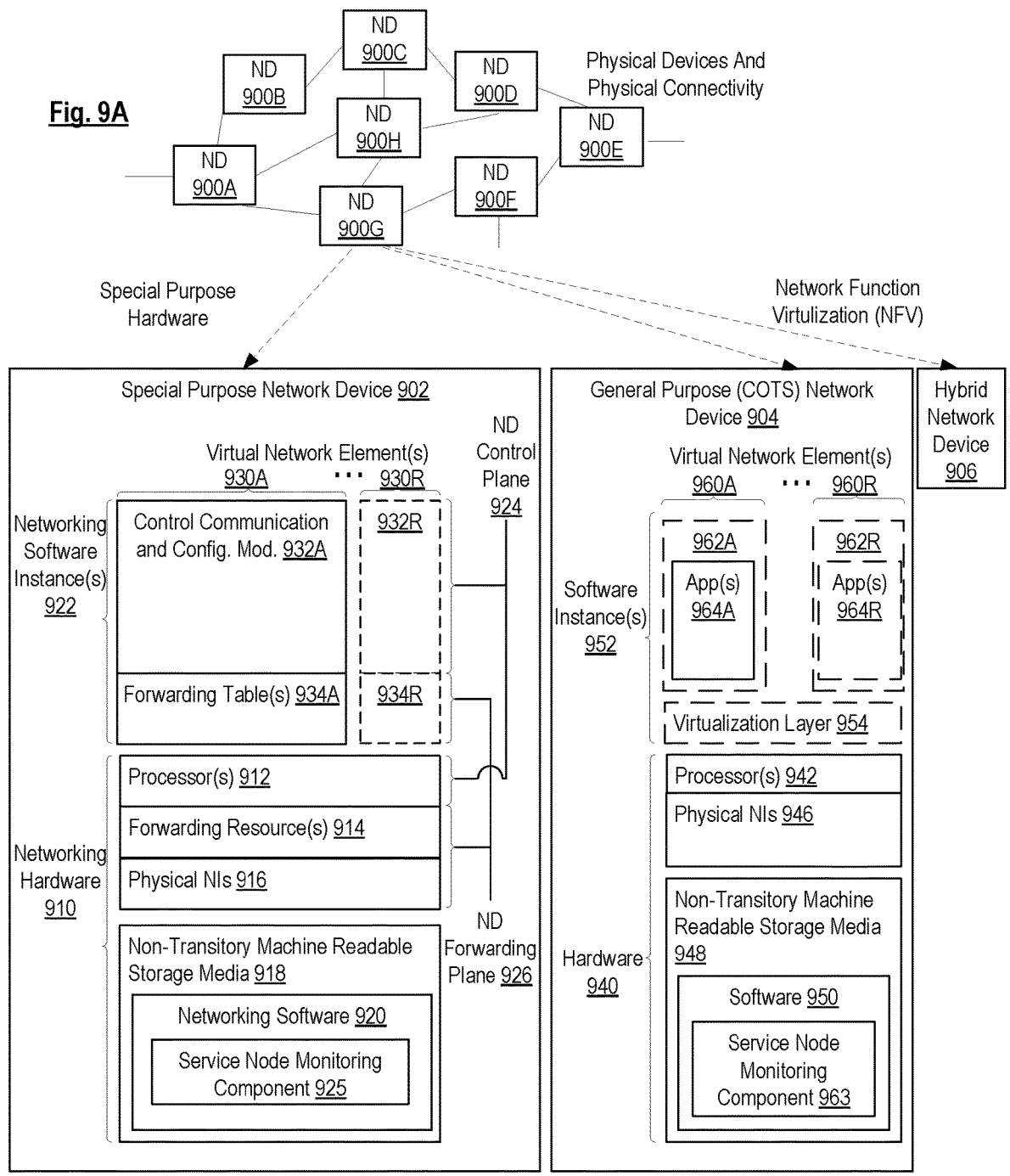
FIG. 9A illustrates connectivity between network devices (NDs) within an exemplary network, as well as three exemplary implementations of the NDs, according to some embodiments of the invention.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application-specific integrated-circuits (ASICs) and a special-purpose operating system (OS); and 2) a general purpose network device 904 that uses common off-the-shelf (COTS) processors and a standard OS.

The special-purpose network device 902 includes networking hardware 910 comprising a set of one or more processor(s) 912, forwarding resource(s) 914 (which typically include one or more ASICs and/or network processors), and physical network interfaces (NIs) 916 (through which network connections are made, such as those shown by the connectivity between NDs 900A-H), as well as non-transitory machine readable storage media 918 having stored therein networking software 920. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

In one embodiment software 920 includes code such as service node monitoring component 925, which when executed by networking hardware 910, causes the special-purpose network device 902 to perform operations of one or more embodiments of the present invention as part of networking software instances 922.

The special-purpose network device 902 is often physically and/or logically considered to include: 1) a ND control plane 924 (sometimes referred to as a control plane) comprising the processor(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the processor(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

Figure 9B:
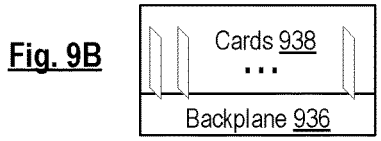
FIG. 9B illustrates an exemplary way to implement a special-purpose network device according to some embodiments of the invention.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and physical NIs 946, as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R.

The virtual network element(s) 960A-R perform similar functionality to the virtual network element(s) 930A-R— e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-R and the physical NI(s) 946, as well as optionally between the instances 962A-R; in addition, this virtual switch may enforce network isolation between the VNEs 960A-R that by policy are not permitted to communicate with each other (e.g., by honoring virtual local area networks (VLANs)).

In one embodiment, software 950 includes code such as service node monitoring component 963, which when executed by processor(s) 942, cause the general purpose network device 904 to perform operations of one or more embodiments of the present invention as part of software instances 962A-R.

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 9C:
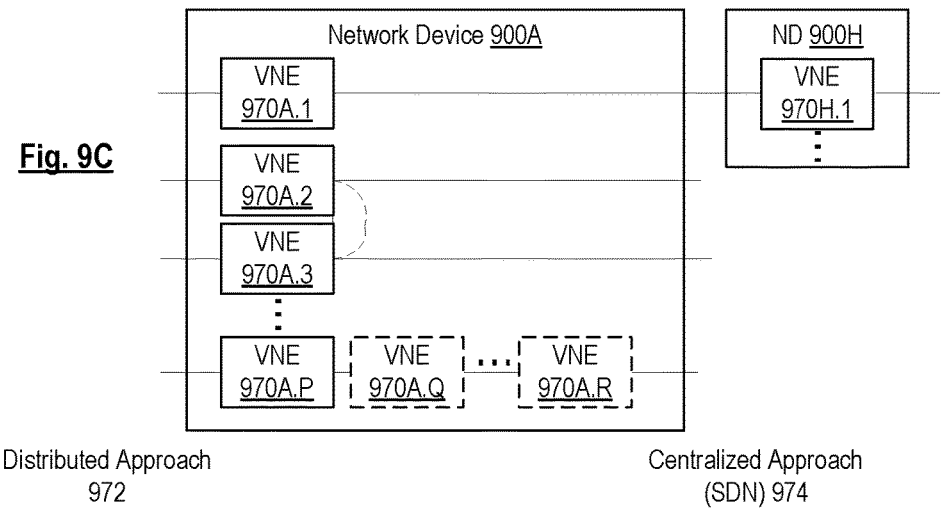
FIG. 9C illustrates various exemplary ways in which virtual network elements (VNEs) may be coupled according to some embodiments of the invention.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software instances 962A-R may operate as servers; the same would be true for the hybrid network device 906; in the case of the special-purpose network device 902, one or more such servers could also be run on a virtualization layer executed by the processor(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 9D:
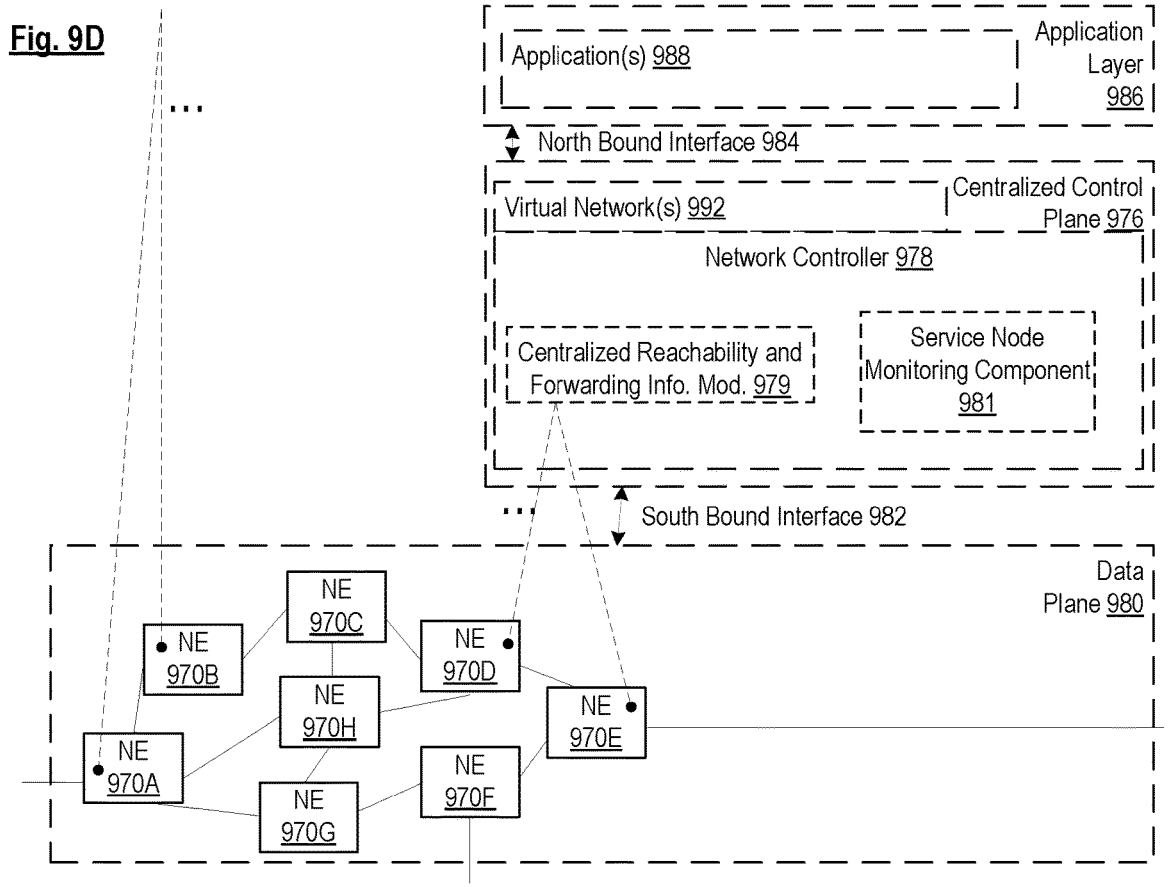
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 970A-H (e.g., the processor(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs. In one embodiment, the network controller 978 includes a service node monitoring component 981 that when executed by the network controller 978, causes the network controller 978 to perform operations of one or more embodiments of the present invention.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the processor(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach).

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
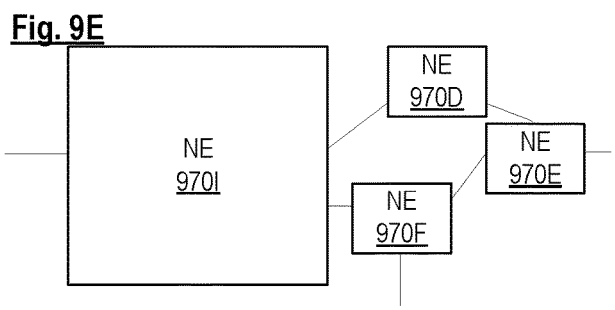
FIG. 9E illustrates the simple case of where each of the NDs implements a single NE, but a centralized control plane has abstracted multiple of the NEs in different NDs into (to represent) a single NE in one of the virtual network(s), according to some embodiments of the invention.
Figure 9F:
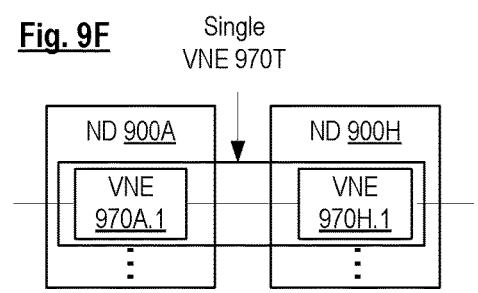
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 9E and 9F respectively illustrate exemplary abstractions of NEs and VNEs that the network controller 978 may present as part of different ones of the virtual networks 992. FIG. 9E illustrates the simple case where each of the NDs 900A-H implements a single NE 970A-H (see FIG. 9D), but the centralized control plane 976 has abstracted multiple of the NEs in different NDs (the NEs 970A-C and G-H) into (to represent) a single NE 9701 in one of the virtual network(s) 992 of FIG. 9D, according to some embodiments of the invention. FIG. 9E shows that in this virtual network, the NE 9701 is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
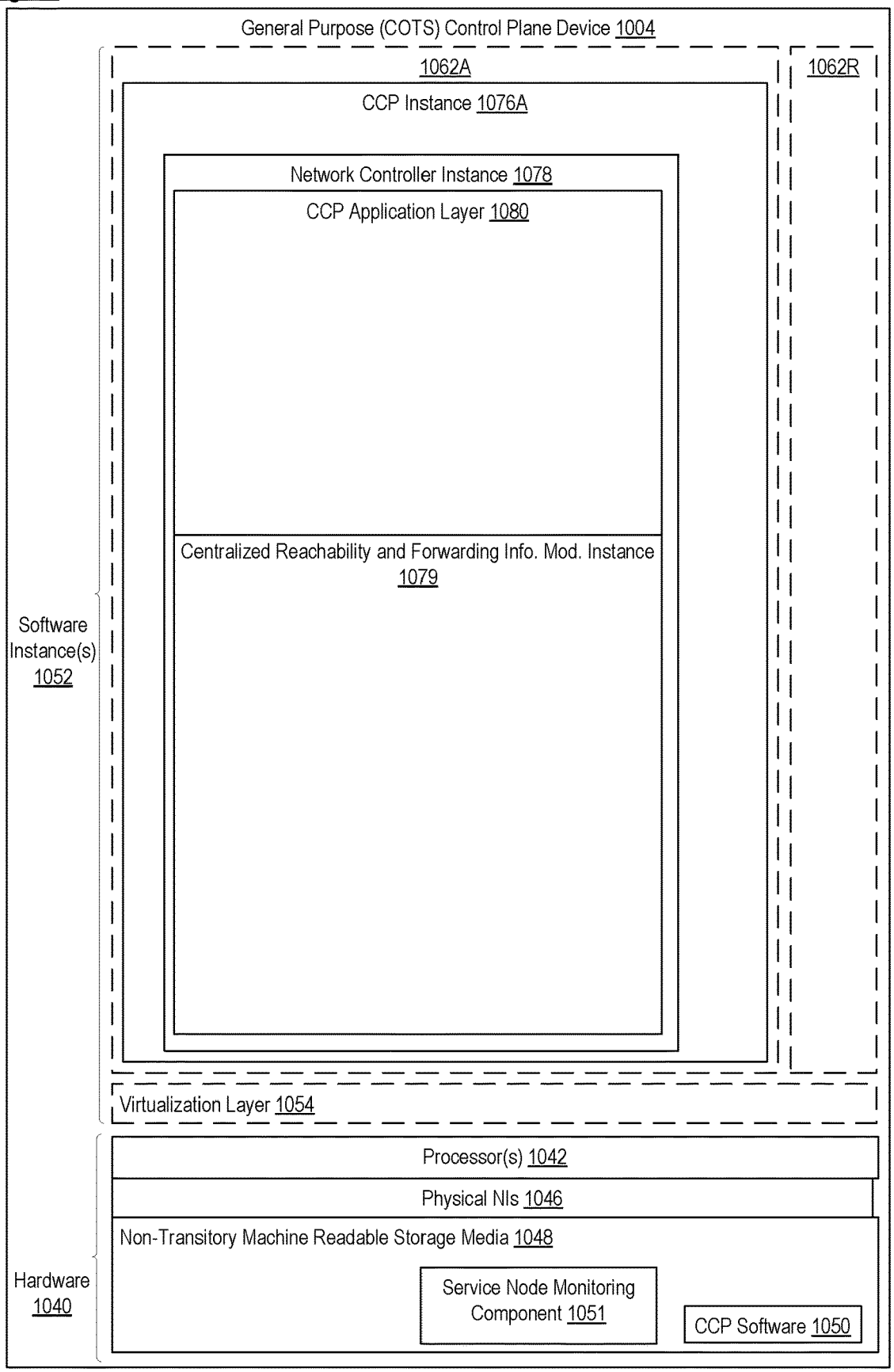
FIG. 10 illustrates a general purpose control plane device with centralized control plane (CCP) software 1050, according to some embodiments of the invention.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and physical NIs 1046, as well as non-transitory machine readable storage media 1048 having stored therein centralized control plane (CCP) software 1050 a service node monitoring component 1051.

In embodiments that use compute virtualization, the processor(s) 1042 typically execute software to instantiate a virtualization layer 1054 (e.g., in one embodiment the virtualization layer 1054 represents the kernel of an operating system (or a shim executing on a base operating system) that allows for the creation of multiple instances 1062A-R called software containers (representing separate user spaces and also called virtualization engines, virtual private servers, or jails) that may each be used to execute a set of one or more applications; in another embodiment the virtualization layer 1054 represents a hypervisor (sometimes referred to as a virtual machine monitor (VMM)) or a hypervisor executing on top of a host operating system, and an application is run on top of a guest operating system within an instance 1062A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1040, directly on a hypervisor represented by virtualization layer 1054 (in which case the unikernel is sometimes described as running within a LibOS virtual machine), or in a software container represented by one of instances 1062A-R). Again, in embodiments where compute virtualization is used, during operation an instance of the CCP software 1050 (illustrated as CCP instance 1076A) is executed (e.g., within the instance 1062A) on the virtualization layer 1054. In embodiments where compute virtualization is not used, the CCP instance 1076A is executed, as a unikernel or on top of a host operating system, on the "bare metal" general purpose control plane device 1004. The instantiation of the CCP instance 1076A, as well as the virtualization layer 1054 and instances 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user-interfaces). At a more abstract level, this CCP application layer 1080 within the centralized control plane 976 works with virtual network view(s) (logical view(s) of the network) and the middleware layer provides the conversion from the virtual networks to the physical view.

The service node monitoring component 1051 can be executed by hardware 1040 to perform operations of one or more embodiments of the present invention as part of software instances 1052.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IF address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

An embodiment of the invention may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

The invention claimed is:

1. A method implemented by a switch in a software defined networking (SDN) network to monitor a service node communicatively coupled to the switch, the method comprising:
   generating, in an SDN packet processing pipeline of the switch, a first flow entry that matches packets received from the service node and includes an instruction to forward matching packets to a service node traffic processing portion of the SDN packet processing pipeline of the switch;
   generating, in the SDN packet processing pipeline of the switch, a second flow entry that matches packet received from the service node, wherein the second flow entry has a priority that is lower than a priority of the first flow entry, wherein the SDN packet processing pipeline of the switch is programmable by an SDN controller;
   removing the first flow entry and transmitting a flow removed message to the SDN controller in response to a determination that the first flow entry has timed out, wherein removal of the first flow entry causes packets received by the switch from the service node to match the second flow entry;
   maintaining a statistic associated with the second flow entry; and
   transmitting a statistics trigger event message to the SDN controller in response to a determination that the statistic associated with the second flow entry exceeds a threshold value;
   forwarding ARP messages received from the SDN controller to the service node; and
   forwarding ARP messages received back from the service node to the SDN controller,
   transmitting the flow removed message to the SDN controller causing the SDN controller to start explicit service node monitoring, the explicit service node monitoring involving injecting explicit service node monitoring traffic into a data plane of the SDN network.

2. The method of claim 1, wherein transmitting the statistics trigger event message to the SDN controller causes the SDN controller to stop explicit service node monitoring.

3. The method of claim 1, further comprising:
   receiving an instruction from the SDN controller to regenerate the first flow entry after transmitting the statistics trigger event message to the SDN controller; and
   regenerating the first flow entry according to the instruction received from the SDN controller.

4. The method of claim 1, wherein the statistic associated with the second flow entry is a packet count of packets that matched the second flow entry.

5. The method of claim 1, further comprising:
   generating, in the SDN packet processing pipeline of the switch, a third flow entry that matches explicit service node monitoring packets received from the service node, wherein the third flow entry has a priority that is higher than the priority of the second flow entry.

6. The method of claim 1, wherein the first flow entry and the second flow entry include an instruction to direct matching packets to a service node traffic processing pipeline.

7. The method of claim 1, wherein the first flow entry and the second flow entry are generated in a foremost flow table of the SDN packet processing pipeline.

8. The method of claim 1, wherein the first flow entry includes an indication of an idle timeout value.

9. The method of claim 1, wherein the second flow entry includes an indication of the threshold value for the statistic.

10. The method of claim 9, wherein the second flow entry includes an indication that the statistics trigger event message is to be transmitted to the SDN controller when the statistic associated with the second flow entry exceeds a multiple of the threshold value.

11. A network device configured to function as a switch in a software defined networking (SDN) network to monitor a service node communicatively coupled to the switch, the network device comprising:
   a set of one or more processors; and
   a non-transitory machine-readable storage medium having stored therein a service node monitoring component, which when executed by the set of one or more processors, causes the network device to generate, in an SDN packet processing pipeline of the switch, a first flow entry that matches packets received from the service node and includes an instruction to forward matching packets to a service node traffic processing portion of the SDN packet processing pipeline of the switch, generate, in the SDN packet processing pipeline of the switch, a second flow entry that matches packet received from the service node, wherein the second flow entry has a priority that is lower than a priority of the first flow entry, wherein the SDN packet processing pipeline is programmable by an SDN controller, remove the first flow entry and transmit a flow removed message to the SDN controller in response to a determination that the first flow entry has timed out, wherein removal of the first flow entry causes packets received by the switch from the service node to match the second flow entry, maintain a statistic associated with the second flow entry, transmit a statistics trigger event message to the SDN controller in response to a determination that the statistic associated with the second flow entry exceeds a threshold value, forward ARP messages received from the SDN controller to the service node, and forward ARP messages received back from the service node to the SDN controller, transmitting the flow removed message to the SDN controller causing the SDN controller to start explicit service node monitoring, the explicit service node monitoring involving injecting explicit service node monitoring traffic into a data plane of the SDN network.

12. The network device of claim 11, wherein transmission of the statistics trigger event message to the SDN controller is to cause the SDN controller to stop explicit service node monitoring.

13. The network device of claim 11, wherein the service node monitoring component, when executed by the set of one or more processors, further causes the network device to receive an instruction from the SDN controller to regenerate the first flow entry after transmitting the statistics trigger event message to the SDN controller and regenerate the first flow entry according to the instruction received from the SDN controller.

14. The network device of claim 11, wherein the statistic associated with the second flow entry is a packet count of packets that matched the second flow entry.

15. A non-transitory machine-readable medium having computer code stored therein, which when executed by a set of one or more processors of a network device functioning as a switch in a software defined networking (SDN) network, causes the network device to perform operations for monitoring a service node communicatively coupled to the switch, the operations comprising:

generating, in an SDN packet processing pipeline of the switch, a first flow entry that matches packets received from the service node and includes an instruction to forward matching packets to a service node traffic processing portion of the SDN packet processing pipeline of the switch;

generating, in the SDN packet processing pipeline of the switch, a second flow entry that matches packet received from the service node, wherein the second flow entry has a priority that is lower than a priority of the first flow entry, wherein the SDN packet processing pipeline of the switch is programmable by an SDN controller;

removing the first flow entry and transmitting a flow removed message to the SDN controller in response to a determination that the first flow entry has timed out, wherein removal of the first flow entry causes packets received by the switch from the service node to match the second flow entry;

maintaining a statistic associated with the second flow entry; and transmitting a statistics trigger event message to the SDN controller in response to a determination that the statistic associated with the second flow entry exceeds a threshold value, forward ARP messages received from the SDN controller to the service node, and forward ARP messages received back from the service node to the SDN controller, transmitting the flow removed message to the SDN controller causing the SDN controller to start explicit service node monitoring, the explicit service node monitoring involving injecting explicit service node monitoring traffic into a data plane of the SDN network.

16. The non-transitory machine-readable medium of claim 15, wherein the computer code, when executed by the set of one or more processors of the network device, causes the network device to perform further operations comprising:

receiving an instruction from the SDN controller to regenerate the first flow entry after transmitting the statistics trigger event message to the SDN controller; and regenerating the first flow entry according to the instruction received from the SDN controller.

17. The non-transitory machine-readable medium of claim 15, wherein the statistic associated with the second flow entry is a packet count of packets that matched the second flow entry.

18. The non-transitory machine-readable medium of claim 15, wherein the computer code, when executed by the set of one or more processors of the network device, causes the network device to perform further operations comprising:

generating, in the SDN packet processing pipeline of the switch, a third flow entry that matches explicit service node monitoring packets received from the service node, wherein the third flow entry has a priority that is higher than the priority of the second flow entry.

* * * * *